United States Patent
Koz et al.

[11] Patent Number: 5,581,297
[45] Date of Patent: Dec. 3, 1996

[54] LOW POWER VIDEO SECURITY MONITORING SYSTEM

[75] Inventors: Mark C. Koz, Santa Clara; Masato Hata, Sunnyvale, both of Calif.

[73] Assignee: Intelligent Instruments Corporation, Santa Clara, Calif.

[21] Appl. No.: 367,219

[22] PCT Filed: Jul. 24, 1992

[86] PCT No.: PCT/US92/06221

§ 371 Date: Jan. 10, 1995

§ 102(e) Date: Jan. 10, 1995

[87] PCT Pub. No.: WO94/03014

PCT Pub. Date: Feb. 3, 1994

[51] Int. Cl.[6] ............................................. H04N 7/18
[52] U.S. Cl. .................... 348/152; 348/153; 348/143; 348/363; 340/539; 340/538
[58] Field of Search ............................ 348/153, 152, 348/143, 151, 154, 363, 364, 365; 340/539, 538, 310; 345/179, 181, 183; 395/750, 550

[56] References Cited

U.S. PATENT DOCUMENTS

| | | | |
|---|---|---|---|
| 3,988,533 | 10/1976 | Mick et al. | 178/6.8 |
| 4,565,999 | 1/1986 | King et al. | 340/706 |
| 4,685,129 | 8/1987 | Gavriolovich | 379/324 |
| 4,819,164 | 4/1989 | Branson | 364/200 |
| 4,825,457 | 4/1989 | Lebowitz | 379/40 |
| 4,857,912 | 8/1989 | Everett et al. | 340/825.06 |
| 4,860,103 | 8/1989 | Azam et al. | 558/160 |
| 4,884,132 | 11/1989 | Morris et al. | 358/93 |
| 4,951,147 | 8/1990 | Aknar et al. | 358/209 |
| 5,021,679 | 6/1991 | Fairbanks et al. | 307/66 |
| 5,132,968 | 7/1992 | Cephus | 340/539 |
| 5,144,544 | 9/1992 | Jenneve et al. | 363/21 |
| 5,144,661 | 9/1992 | Shamosh et al. | 340/540 |
| 5,150,100 | 9/1992 | Black et al. | 340/539 |
| 5,164,827 | 11/1992 | Paff | 348/143 |
| 5,185,667 | 2/1993 | Zimmermann | 348/143 |
| 5,202,759 | 4/1993 | Laycock | 348/153 |
| 5,218,704 | 6/1993 | Watts, Jr. et al. | 348/153 |
| 5,233,342 | 8/1993 | Yashiro et al. | 340/825.06 |
| 5,270,811 | 12/1993 | Ishibashi et al. | 348/155 |
| 5,272,527 | 12/1993 | Watanabe | 348/153 |
| 5,287,353 | 2/1994 | Buda et al. | 340/825.06 |
| 5,327,233 | 7/1994 | Choi | 348/153 |
| 5,379,441 | 1/1995 | Watanabe et al. | 340/310.08 |
| 5,418,969 | 5/1995 | Matsunaki | 395/750 |

*Primary Examiner*—Tommy P. Chin
*Attorney, Agent, or Firm*—Donald E. Schreiber

[57] ABSTRACT

If motion occurs in an area viewed by a lens (14) of a video camera (12), a video security monitoring system (10) establishes a communication link with a video monitoring facility and begins transmitting compressed video images of the area. The system (10) is fabricated from CMOS integrated circuits, and operates at a reduced clock frequency while motion is not detected. Reducing the clock frequency lowers the required power thus permitting operation of the system (10) on energy supplied by an ISDN basic access communication channel. If motion occurs, a digital video image compression subsystem (16) begins producing low quality compressed video data for transmission to the monitoring facility. If motion occurs in the central region of the area viewed by the lens (14), then the subsystem (16) produces a single high quality compressed video image. Commands transmitted from the monitoring facility to the video security monitoring system (10) may control its entire operation.

29 Claims, 2 Drawing Sheets

LOW POWER VIDEO SECURITY MONITORING SYSTEM

TECHNICAL FIELD

The present invention relates generally to the technical field of security devices that sense movement, and more particularly, to video systems for observing an area to detect motion.

BACKGROUND ART

Well known in the art are video security systems that present an observer located at a video monitoring facility with a succession of images of different areas, each area being viewed by a lens of a different video camera. However, these video systems are completely passive in the sense that detecting an intrusion into the area viewed by the camera's lens remains the responsibility of the observer. That is, the video camera provides the observer with no assistance in detecting an intrusion. Thus, if the observer at the video monitoring facility is distracted or fails to notice the occurrence of an intrusion, no alarm will be raised. It is also possible that the occurrence of an intrusion might be missed because images of other areas are being presented to the observer at the instant the intrusion occurs. Furthermore, because the video signal from each video camera must be transmitted to the video monitoring facility by a wide bandwidth, coaxial cable, or by some other type of wide bandwidth, dedicated communication channel such as a microwave link, it is commercially impractical to distribute this type of video security system at sites randomly located within an extended geographic area, such as throughout a large city.

In addition to well known, passive security systems of the type described above, active, motion sensing video systems have been developed for military battlefield applications. However, these experimental military systems were physically very large, e.g. were carried on a trailer and towed by a jeep, consumed hundreds of watts of power, and were very expensive.

Recently, throughout the world, telephone systems have begun providing digital communication capability in accordance with the Integrated Services Digital Network ("ISDN") standard established by the International Telegraph and Telephone Consultative Committee ("CCITT"). Under this CCITT standard, a basic ISDN access consists of two full-duplex 64 kilobits per second ("kbps") digital data channels, called channel B1 and channel B2, plus another full-duplex 16-kbps digital channel, called a D channel. Under the CCITT standard, using time division multiplexing, all three of these digital data channels may be transmitted over a single pair of twisted wires, or over two pairs of twisted wires. While ISDN basic access was originally intended to provide voice and slow speed data communication services, over the years developments in digital signal processing and compression techniques have advanced technology to the extent that compressed video data may now be transmitted using an ISDN basic access communication channel. These techniques have progressed to such an extent that there now exist several alternative video data compression techniques such as the CCITT H.261 picture phone standard, the Joint Photographic Experts Group ("JPEG") standard, and the Moving Picture Experts Group ("MPEG") standard that permit transmission of video images over an ISDN basic access communication channel. Furthermore, the CCITT has established a standard H.221 which permits intermixed transmission over an ISDN basic access communication channel of images compressed in accordance with both the H.261 picture phone standard, and images compressed in accordance with the JPEG standard.

DISCLOSURE OF INVENTION

An object of the present invention is to provide a video security monitoring system that may be economically installed at randomly located sites within a large geographic area.

Another object of the present invention is to provide a video security monitoring system that assists an observer at a video monitoring facility in detecting the occurrence of motion in the area viewed by a lens of a video camera.

Another object of the present invention is to provide a video security monitoring system that detects movement in the area viewed by a lens of a video camera even thought an observer at a video monitoring facility is not presently observing an image of the area.

Another object of the present invention is to provide a video security monitoring system that may be installed more easily.

Another object of the present invention is to provide a video security monitoring system that retains an image of an intrusion for an unlimited period of time thereafter, even following an interruption of electrical power to the video security monitoring system.

Another object of the present invention is to provide a video security monitoring system that may surreptitiously illuminate an area while it is being observed.

Another object of the present invention is to provide a video security monitoring system adapted for verifying an individual's authorization to enter the area under observation.

Yet another objection of the present invention is to provide an economically practical motion sensing video security monitoring system.

Briefly, a video security monitoring system in accordance with the present invention includes a video camera for producing a video signal from an image of an area viewed by a lens of the video camera. The video security monitoring system also includes a digital video image compression subsystem that receives the video signal from the video camera. Upon receiving the video signal, the digital video image compression subsystem processes the video signal to determine if any motion is occurring in the area viewed by the camera's lens. If the digital video image compression subsystem detects motion, it notifies a digital signal transmission interface and control that motion has been detected.

The digital signal transmission interface and control, which supervises the overall operation of the video security monitoring system, upon being notified that the digital video image compression subsystem has detected motion activates the digital video image compression subsystem to begin converting the video signal into compressed digital video data. After converting the image of the area being viewed by the video camera's lens into compressed digital video data, the digital video image compression subsystem transmits the compressed data to the digital signal transmission interface and control. The digital signal transmission interface and control in turn transmits the compressed digital video data from the video security monitoring system to a remote video monitoring facility.

In the preferred embodiment of the video security monitoring system of the present invention, the digital signal transmission interface and control transmits the compressed digital video data to the video monitoring facility via an ISDN basic access communication channel. Because telephone systems in the industrialized nations generally provide ISDN basic access communications, the digital signal transmission interface and control need establish a connection for communicating with the video monitoring facility only if the digital video image compression subsystem detects motion in the area viewed by the video camera's lens.

Furthermore, because the ISDN basic access communication channel provides a specified amount of electrical power to a device connected thereto, operation of a video security monitoring system in accordance with the preferred embodiment of the present invention may be energized by electrical power drawn from the ISDN basic access communication channel. During intervals in which motion does not occur, the video security monitoring system operates on only a fraction of the electrical power, i.e., less than one-half watt, provided by the ISDN basic access communication channel. The video security monitoring system operates on such a small amount of power because it is fabricated from Complementary Metal Oxide Silicon ("CMOS") integrated circuits ("ICs") that operate at a reduced clock frequency when notion is not detected. Energizing the video security monitoring system with electrical power drawn from the communication channel significantly simplifies installation of a video security monitoring system since only a single electrical connection must be established.

A video security monitoring system in accordance with the present invention may also include a compressed data memory for temporarily storing compressed digital video data produced by the digital video image compression subsystem. A compressed data memory may be advantageously included in the video security monitoring system of the present invention to temporarily store compressed digital video data during an interval between detection of motion by the digital video image compression subsystem and establishment of an ISDN basic access communication link between the video security monitoring system and the video monitoring facility. If compressed digital video data has been stored in the compressed data memory, responsive to commands transmitted from an observer at the video monitoring facility to the video security monitoring system, the system may provide the observer with images of the area viewed by the camera's lens beginning at the instant at which the digital video image compression subsystem detects motion. Moreover, because the preferred embodiment of the compressed data memory retains compressed digital video data after an interruption of electrical power to the video security monitoring system, images stored in the compressed data memory may be retrieved and viewed long after their occurrence and storage.

The video security monitoring system of the present invention may also include a camera control for effecting changes in various settings of the video camera responsive to control signals received from the digital signal transmission interface and control. For example, the camera control may be adapted for changing the setting of the camera's iris, the focus of the camera's lens, and the lens' zoom if the camera has a zoom lens. Furthermore, the camera control may also be adapted for tilting and panning the video camera to change the area viewed by its lens. Analogously, the video security monitoring system may also include a serial control for exchanging signals between the digital signal transmission interface and control and a monitoring device external to the video security monitoring system. For example, the serial control might exchange signals between the digital signal transmission interface and control and a weather station that monitors atmospheric conditions.

A video security monitoring system in accordance with the present invention may also include a strobe light for illuminating the area viewed by the camera's lens. The area viewed by the lens is preferably illuminated by the strobe light only at the instant the video camera is acquiring an image to be processed by the digital video image compression subsystem. This mode of operating the strobe light reduces the electrical power required by the video security monitoring system. The strobe light is preferably a Light Emitting Diode ("LED") that emits infra red illumination. Because an intruder cannot normally perceive the presence of infra red illumination, if they do not possess an infra red detector they will be unaware that they are being illuminated by the video security monitoring system.

A video security monitoring system in accordance with the present invention may also include a stylus having a source of illumination that may be directed toward the camera's lens. If an individual appropriately positions this stylus while writing an identifying message, for example while writing their name, the video security monitoring system may verify their authorization to enter the area observed by the video security monitoring system. As with the strobe light, the source of illumination included in the stylus is preferable an infra red emitting LED.

A video security monitoring system in accordance with the present invention may also include a microphone for producing an audio signal from sound occurring about the video security monitoring system. If the video security monitoring system includes a microphone, it will also include a digital audio compression-decompression subsystem that receives the audio signal from the microphone. Upon receiving the audio signal, the digital audio compression-decompression subsystem processes the audio signal to determine if any change in sound has occurred about the video security monitoring system. If the digital audio compression-decompression subsystem detects a change in sound, the digital signal transmission interface and control commands it to begin converting the audio signal into compressed digital audio data. After converting the audio signal into compressed digital audio data, the digital audio compression-decompression subsystem transmits the compressed digital audio data to the digital signal transmission interface and control. Similar to the transmission of compressed digital video data to the video monitoring facility, the digital signal transmission interface and control also transmits the compressed digital audio data to that facility, and may also store the compressed digital audio data in the compressed data memory, if one is included in the video security monitoring system.

If the video security monitoring system includes a digital audio compression-decompression subsystem, that subsystem may also receive compressed digital audio data from the digital signal transmission interface and control. If the video security monitoring system also includes a speaker, the digital audio compression-decompression subsystem converts the compressed digital audio data into an audio signal and transmits that signal to the speaker for producing an audible sound. Inclusion of a digital audio compression-decompression subsystem and a speaker in the video security monitoring system permits an observer at the video monitoring facility to communicate audibly with anyone in the vicinity of the system.

These and other features, objects and advantages will be understood or apparent to those of ordinary skill in the art from the following detailed description of the preferred embodiment as illustrated in the various drawing figures.

BEST MODE FOR CARRYING OUT THE INVENTION

Figure 1:
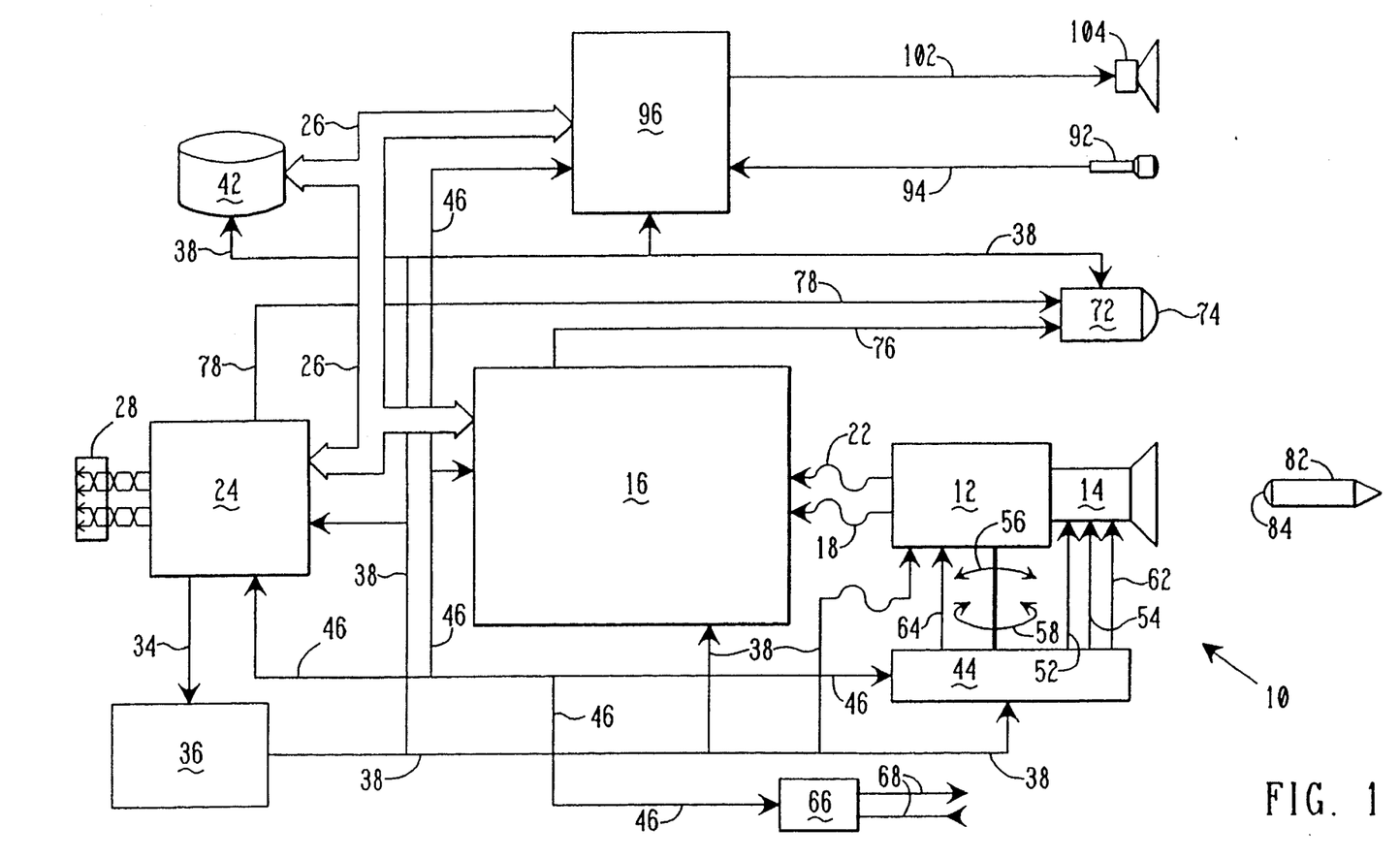
FIG. 1 is a block diagram depicting a video security monitoring system in accordance with the present invention including its video camera, its digital video image compression subsystem, its digital signal transmission interface and control, and its digital audio compression-decompression subsystem.

FIG. 1 is a block diagram depicting a video security monitoring system in accordance with the present invention identified by the general reference character 10. The video security monitoring system 10 includes a video camera 12. The video camera 12 may be selected from among those provided by various manufacturers such as a model CCB-C35T sold by Sony Corporation of Japan. The video camera 12 includes a lens 14 that, in the illustration of FIG. 1, has adjustable iris, focus, and zoom. Depending upon the particular application for the video security monitoring system 10, the lens 14 of the video camera 12 may or may not include all of these features. The video camera 12 produces video timing signals and transmits them to a digital video image compression subsystem 16 via a video timing signals bus 18. The video timing signals present on the video timing signals bus 18 synchronize the operation of the digital video image compression subsystem 16 to that of the video camera 12. In synchronism with the video timing signals, the video camera 12 produces a video signal of an image of an area viewed by the lens 14 that is transmitted over a video signal bus 22 to the digital video image compression subsystem 16.

Upon receiving the video signal from the video camera 12, the digital video image compression subsystem 16 processes the video signal to determine if any motion is occurring in the area viewed by the lens 14. The digital video image compression subsystem 16 detects motion by comparing the video signal for the present image with that of a prior image seeking differences between the two images. If the digital video image compression subsystem 16 detects motion, it notifies a digital signal transmission interface and control 24 that motion has occurred by transmitting data to the interface and control 24 over a system bus 26.

The digital signal transmission interface and control 24 supervises the overall operation of the digital video image compression subsystem 16, and the video camera 12. If the digital video image compression subsystem 16 notifies the digital signal transmission interface and control 24 that it has detected motion, the interface and control 24 transmits a command to the subsystem 16 via the system bus 26 commanding it to begin producing compressed digital video data of the area viewed by the lens 14. After converting the image of the area being viewed by the lens 14 into compressed digital video data, the digital video image compression subsystem 16 transmits the compressed data to the digital signal transmission interface and control 24 via the system bus 26. The digital signal transmission interface and control 24 then transmits the compressed digital video data from the video security monitoring system 10 to a remote video monitoring facility (not illustrated in any of the FIGS.).

In the preferred embodiment of the video security monitoring system 10 of the present invention, the digital signal transmission interface and control 24 transmits the compressed digital video data to the video monitoring facility via an ISDN basic access communication channel 28. While the video security monitoring system 10 of the present invention preferably communicates with the video monitoring facility via an ISDN basic access communication channel 28, the use of various alternative communication channels is within the purview of the present invention. Thus, alternative embodiments of the video security monitoring system 10 may transmit compressed digital video data to the video monitoring facility via an ISDN primary access communication channel, via an analog signal communication channel such as a conventional analog telephone line, a twisted pair of wires, or a coaxial cable, via an optical fibre communication channel, or via a wireless communication channel. If the video security monitoring system 10 communicates with the video monitoring facility via an analog signal communication channel, the digital signal transmission interface and control 24 of the system 10 may include a modem to facilitate transmission of digital data.

The ISDN basic access communication channel 28 provides up to 10 milliamperes of direct current at 48 volts, i.e. 0.48 watts of electrical power, to the digital signal transmission interface and control 24. The digital signal transmission interface and control 24 separates this DC power from the other signals present on the ISDN basic access communication channel 28, and transmits the power via an ISDN power line 34 to a power supply 36 included in the video security monitoring system 10. The power supply 36 converts the comparatively high voltage electrical power provided by the ISDN basic access communication channel 28 into voltage(s) suitable for energizing the operation of the video security monitoring system 10. An electrical power bus 38 distributes the electrical power produced by the power supply 36 throughout the video security monitoring system 10 to the video camera 12, to the digital video image compression subsystem 16, to the digital signal transmission interface and control 24, and to other electrically powered devices that may be included in the video security monitoring system 10.

To permit energizing the operation of the video security monitoring system 10 with the power supply 36 during intervals of peak power consumption, the power supply 36 includes an electrical energy storage device such as a battery (not illustrated in any of the FIGS.). The electrical energy storage device included in the power supply 36 stores electrical energy received from the ISDN basic access communication channel 28 during intervals of low power consumption by the video security monitoring system 10, and later supplies that energy to the system 10 during intervals of power consumption greater than that which the ISDN basic access communication channel 28 supplies to the system 10.

The video security monitoring system 10 may also include a compressed data memory 42 for temporarily storing compressed digital video data produced by the digital video image compression subsystem 16. The compressed data memory 42 may be advantageously included in the video security monitoring system 10 to temporarily store compressed digital video data during an interval between detection of motion by the digital video image compression subsystem 16 and establishment of the ISDN basic access communication link between the video security monitoring system 10 and the video monitoring facility. The inclusion of the compressed data memory 42 in the video security monitoring system 10 assures preservation of images beginning at the instant the digital video image compression subsystem 16 sensed movement.

Because the compressed data memory 42 exchanges data with the digital signal transmission interface and control 24 over the system bus 26, compressed digital video data stored in the compressed data memory 42 must first be transferred from the digital video image compression subsystem 16 to the digital signal transmission interface and control 24, after which the digital signal transmission interface and control 24 transfers the compressed digital video data to the compressed data memory 42. The compressed data memory 42 operates as a queue buffer with the most recent compressed digital video data replacing the oldest compressed digital video data previously stored in the compressed data memory 42. If commands received by the video security monitoring system 10 from the video monitoring facility request transmission of the compressed digital video data stored in the compressed data memory 42, then the digital signal transmission interface and control 24 retrieves the requested compressed digital video data from the compressed data memory 42 and transmits it to the video monitoring facility.

The compressed data memory 42, which receives its electrical power from the electrical power bus 38, is preferably either a low power hard disk drive having a capacity of at least 20 MBytes, or a corresponding amount of semiconductor FLASH memory. Both of these types of memories retain data after a power interruption, thus preserving for later recovery the data most recently stored in the compressed data memory 42. Thus, simply severing the ISDN basic access communication channel 28 does not destroy the most recent images stored in the compressed data memory 42.

The video security monitoring system 10 may also include a camera control 44 for effecting changes in various settings of the video camera 12 responsive to control signals received from the digital signal transmission interface and control 24 via a camera controls signal bus 46. Depending upon the precise configuration of the video camera 12, the camera control 44, which receives its electrical power from the electrical power bus 38, may be adapted for changing various different settings of the video camera 12. Thus, if the video camera 12 includes a focus adjustment, the camera control 44 may include a focus control 52 for adjusting the focus of the video camera 12. Similarly, if the lens 14 includes a zoom adjustment, the camera control 44 may include a zoom control 54 for adjusting the zoom of the video camera 12. The camera control 44 may also be adapted to change the area viewed by the lens 14 by tilting the video camera 12 up and down, as indicated by the double-headed curved arrow 56. Similarly, the camera control 44 may also be adapted to change the area viewed by the lens 14 by panning the video camera 12 from side to side, as indicated by the double-headed circular arrow 58.

A video camera 12 always includes an iris control to permit adapting the camera 12 to changes in illumination and/or operation of the video security monitoring system 10. For example, even if the video camera 12 is located indoors, lights illuminating the area viewed by the lens 13 of the video camera 12 may go out due to a power failure. Under such a condition of reduced illumination it is necessary to adjust the iris to increase the sensitivity of the camera 12. Alternatively, an intruder might shines something bright into the lens 14 of the video camera 12 in an attempt to "blind" it. Under such a condition of increased illumination it is necessary to adjust the iris to decrease the sensitivity of the camera 12. Consequently, even in the simplest of installations, the camera control 44 always includes a control 62 for adjusting the iris of the video camera 12. Furthermore, the location of the iris need not be limited to the lens 14. Some models of video cameras 12 include an electronic control that function similarly to an iris. Therefore, it is within the purview of the present invention to use the signal for the iris control 62 for electronically adjusting the sensitivity of the video camera 12.

The camera control 44 must be capable of moving each of the camera controls identified above, i.e. the focus control 52, the zoom control 54, the tilt control 56, the pan control 58, and the iris control 62, in two directions. That is, the camera control 44 must be capable of first advancing the control in a particular direction, and subsequently retracting the control in the opposite direction. Consequently, for each of the controls included in the camera control 44, the control 44 must receive two type of control signals from the digital signal transmission interface and control 24, one to advance the control, and one to retract the control.

The video security monitoring system 10 may also include a serial control 66 for exchanging signals, via the camera controls signal bus 46, between the digital signal transmission interface and control 24 and a monitoring device (not illustrated in any of the FIGS.) external to the system 10. The serial control 66 preferably provides bidirectional interface 68, such as an RS232 or "S" interface, to permit two-way communication between the digital signal transmission interface and control 24 and the external monitoring device. For example, if the video security monitoring system 10 were installed out-of-doors, perhaps monitoring a construction site, the serial control might exchange signals between the digital signal transmission interface and control 24 and a weather station located at the construction site that senses atmospheric conditions such as wind speed.

The video security monitoring system 10 may also include a strobe light 72 having a LED 74 for illuminating the area viewed by the lens 14. Illumination by the LED 74 of the strobe light 72, which receives electrical power from the power supply 36 via the electrical power bus 38, may be triggered either by a control signal received from the digital video image compression subsystem 16 via a first strobe control signal line 74, or by a control signal received from the digital signal transmission interface and control 24 via a second strobe control signal line 76.

The video security monitoring system 10 may also include a stylus 82 having a battery powered LED 84 whose infra red radiation may be directed toward the lens 14. If an individual appropriately holds the stylus 82 to direct light from its LED 84 toward the lens 14 while writing an identifying message, for example while writing their name, the video security monitoring system 10 may verify their identity. Such verification may be made either by visual observation of the image by an observer at the video monitoring facility, or by a computer program executed by a digital computer located at the video monitoring facility, or executed in the digital signal transmission interface and control 24 of the video security monitoring system 10.

The video security monitoring system 10 may also include a microphone 92 for producing an audio signal from sound occurring about the video security monitoring system 10. The microphone 92 transmits its audio signal via an audio input line 94 to a digital audio compression-decompression subsystem 96. Upon receiving the audio signal from the microphone 92, the digital audio compression-decompression subsystem 96 processes the audio signal to determine if any change in sound has occurred about the video security monitoring system 10. If the digital audio compression-decompression subsystem 96 detects a change in sound, it converts audio signal into compressed digital audio data that it then transmits via the system bus 26 to the digital signal transmission interface and control 24. Similar to the transmission of compressed digital video data to the video monitoring facility, the digital signal transmission interface and control 24 also transmits the compressed digital audio data to that facility, and may also store the compressed digital audio data in a queue buffer in the compressed data memory 42, if one is included in the video security monitoring system 12.

If the video security monitoring system 10 includes the digital audio compression-decompression subsystem 96, the subsystem may also receive compressed digital audio data from the digital signal transmission interface and control 24. The digital audio compression-decompression subsystem 96 converts such compressed digital audio data into an audio signal and transmits that signal via a audio output line 102 to a speaker 104.

The Digital Video Image Compression Subsystem 16

Figure 2:
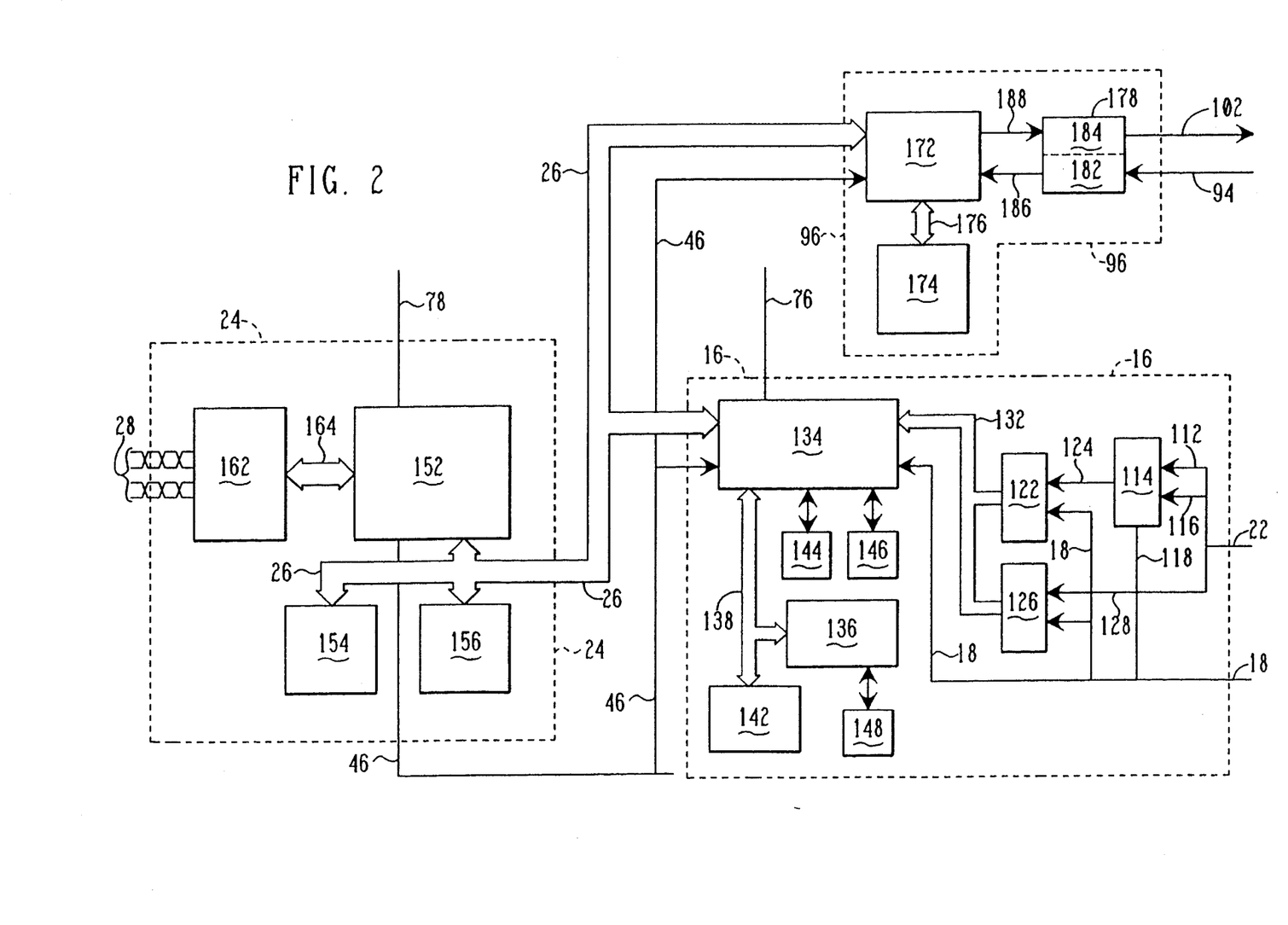
FIG. 2 is a block diagram depicting in greater detail the digital video image compression subsystem, the digital signal transmission interface and control, and the digital audio compression-decompression subsystem illustrated in FIG. 1.

Referring now to FIG. 2, depicted there are block diagrams respectively of the digital video image compression subsystem 16, of the digital signal transmission interface and control 24, and of the digital audio compression-decompression subsystem 96. As depicted in FIG. 2, the digital video image compression subsystem 16 receives the video signal from the video camera 12 via the video signal bus 22. The Sony CCB-C35T video camera 12 of the preferred embodiment transmits R-Y, B-Y, and Y video signals to the digital video image compression subsystem 16. Within the digital video image compression subsystem 16, the R-Y signal from the video camera 12 is applied via a R-Y signal line 112 of the video signal bus 22 to one input of a 2:1 multiplexer 114. The other input of the 2:1 multiplexer 114 receives the B-Y signal from the video camera 12 via a B-Y signal line 116 of the video signal bus 22.

Responsive to a clock signal supplied to the 2:1 multiplexer 114 from the video timing signals bus 18 via a multiplexer control signal line 118, the 2:1 multiplexer 114 transmits either the R-Y or the B-Y video signal to an input of a chroma analog-to-digital converter ("ADC") 122 via a chroma signal line 124. The chroma ADC 122 is preferably a TDA8709 Video Analog Input Interface IC manufactured by Philips Components-Signetics of Sunnyvale, Calif. The Y signal, that is transmitted to the digital video image compression subsystem 16 from the video camera 12, is supplied to an input of a luminance ADC 126 via a Y signal line 128 of the video signal bus 22. The luminance ADC 126 is preferably a TDA8708 Video Analog Input Interface IC manufactured by Philips Components-Signetics of Sunnyvale, Calif. Both the chroma ADC 122 and the luminance ADC 126 receive the video timing signals that the video camera 12 transmits to the digital video image compression subsystem 16 via the video timing signals bus 18. Responsive to these video timing signals, the chroma ADC 122 digitizes either the R-Y or the B-Y signal that it receives from the 2:1 multiplexer 114 while the luminance ADC 126 concurrently digitizes the Y signal. Thus, concurrent operation of the chroma ADC 122 and the luminance ADC 126 produces uncompressed digital video data.

The uncompressed digital video data produced by the chroma ADC 122 and luminance ADC 126 are transmitted via a video data bus 132 to an Integrated Information Technology, Inc. ("IIT") Vision Controller ("VC") IC 134. The digital video image compression subsystem 16 also includes an IIT Vision Processor ("VP") IC 136 that exchanges video data with the VC IC 134 via a compressed video data bus 138. Both the VC IC 134 and the VP IC 136 are manufactured by Integrated Technology, Inc. of Santa Clara, Calif. The digital video image compression subsystem 16 also includes a 2 Mbyte or larger frame buffer dynamic random access memory ("DRAM") 142. The DRAM 142 is accessed via the compressed video data bus 138 by the VC IC 134 and the VP IC 136. The digital video image compression. subsystem 16 also includes a 32 Kbyte boot read only memory ("ROM") 144 and a 64 Kbyte static random access memory ("SRAM") 146 that are accessible only to the VC IC 134. Analogously, the VP IC 136 accesses its own dedicated 32 Kbyte SRAM 148.

In receiving uncompressed digital video data from the chroma ADC 122 and the luminance ADC 126, the VC IC 134 operates in synchronism with the video timing signals supplied to the digital video image compression subsystem 16 by the video camera 12 via the video timing signals bus 18. While the combined VC IC 134 and VP IC 136 are designed for producing compressed digital video data directly from uncompressed digital video data, in the video security monitoring system 10 they perform that function only if motion has been detected in the area viewed by the lens 14.

If motion has not been detected in the area viewed by the lens 14, to minimize the consumption of electrical power while retaining a capability for detecting motion, the VC IC 134 and the VP IC 136 merely scan each entire image received from the video camera 12 successively comparing a block of pixels from the most recent image with the corresponding block of pixels from the immediately preceding image. As the VC IC 134 and VP IC 136 scan the two images comparing blocks of pixels, the VC IC 134 cumulates a number representing the average number of pixels that change between pairs of blocks of pixels processed thus far for this pair of images. If the average number of pixels that change per block exceeds a pre-established threshold, then the VC IC 134 transmits data to the digital signal transmission interface and control 24 via the system bus 26 notifying it that motion has been detected.

If motion is detected, responsive to control data received from the digital signal transmission interface and control 24, the digital video image compression subsystem 16 begins producing video data compressed in accordance with the CCITT H.261 picture phone standard. In processing video data received from the chroma ADC 122 and the luminance ADC 126 to produce the compressed digital video data, the VC IC 32 preprocesses that data, supplies the preprocessed video data to the VP IC 136 via the compressed video data bus 138, and supervises compression of the video data by the VP IC 136. After the VP IC 136 compresses the video data, the VC IC 134 performs Huffman coding on the compressed data, and transmits the now Huffman encoded compressed digital video data via the system bus 26 to the digital signal transmission interface and control 24.

In addition to monitoring consecutive images received from the video camera 12 for motion and producing compressed digital video data if motion has occurred, the VC IC 134 may also transmit a control signal to the strobe light 72 via the first strobe control signal line 76 that causes the strobe light 72 to illuminate the area viewed by the lens 14 of the video camera 12.

The Digital Signal Transmission Interface and Control 24

The digital signal transmission interface and control 24 includes a microcomputer IC 152 that communicates with the VC IC 134 of the digital video image compression subsystem 16 via the system bus 26. The digital signal transmission interface and control 24 also includes a 128 KByte ROM 154 and a 64 KByte SRAM 156 that may also be accessed by the microcomputer 152 via the system bus 26. The microcomputer 152 also communicates with an ISDN interface IC 162 via a ISDN data bus 164. The ISDN interface IC 162 receives data from and transmits data to the ISDN basic access communication channel 28. In addition to supervising the overall operation of the video security monitoring system 10 described in greater detail below, the microcomputer 152 also supervises all aspects of the ISDN basic access communication performed by the ISDN interface IC 162 including call set-up and tear-down.

The microcomputer 152 is preferably a Toshiba TMPZ84C710A and the ISDN interface IC 162 is preferably a Toshiba TA32032F IC, both of which are manufactured by Toshiba, Ltd. of Tokyo, Japan. The Toshiba TMPZ84C710A microcomputer includes both input-output ports and an interface adapted for controlling the operation of an IDE hard disk drive. Consequently, if a hard disk is used for the compressed data memory 42, the memory 42 it need only include a single Programmable Array Logic ("PAL") IC for interfacing to the microcomputer 152.

One of the primary function performed by the microcomputer 152 in controlling the operation of the video security monitoring system 10 is power management. The microcomputer 152 employs two strategies for managing the power consumed by the video security monitoring system 10 during intervals in which the digital video image compression subsystem 16 does not detect motion in the area viewed by the lens 14. The first strategy is to transmit control signals via the camera controls signal bus 46 to all portions of the video security monitoring system 10 turning off those that are not directly involved in intrusion detection. That is, the digital signal transmission interface and control 24 turns off everything but the video camera 12, the digital video image compression subsystem 16, the power supply 36, and, if the video security monitoring system 10 includes a microphone 92, the digital audio compression-decompression subsystem 96.

The second strategy employed is to transmit control signals via the camera controls signal bus 46 to the video camera 12, to the digital video image compression subsystem 16, to the digital signal transmission interface and control 24, and if the video security monitoring system 10 includes a microphone 92, to the digital audio compression-decompression subsystem 96 causing them to reduce their clock speed. Because the entire video security monitoring system 10 is preferably fabricated using CMOS ICs, reducing the clock speed greatly reduces the amount of power required to operate the video security monitoring system 10. If the clock speed is reduced to one-half, the power consumed by the ICs included in the video security monitoring system 10 is reduced to approximately one-fourth of that consumed during full speed operation. If the clock speed is reduced to one-tenth, the power consumed is reduced to approximately one-hundredth of that consumed during full speed operation. While the entire video security monitoring system 10 consumes approximately fourteen watts of power when operating at full speed, the clock speed may be easily reduced to such an extent that the power consumed is significantly less than that provided by a ISDN basic access communication channel while maintaining full capability to detect motion occurring in the area viewed by the lens 14.

A consequence of reducing the clock speed of the video camera 12 when there is no motion in the area viewed by the lens 14 is that the video camera 12 becomes more sensitive. Because of the increased sensitivity of the video camera 12, either the camera 12 must automatically compensate for the increased sensitivity by adjusting its iris, or the microcomputer 152 must adjust the iris to reduce the sensitivity of the video camera 12.

If the digital video image compression subsystem operating at reduced speed detects movement in the area viewed by the lens 14, the microcomputer 152 then signals the various circuits in the video security monitoring system 10 to begin operating at full speed and capacity. Consequently, when the clock speed increases the digital signal transmission interface and control 24 commands the VC IC 134 and VP IC 136 to begin producing digital video data compressed in accordance with the CCITT H.261 standard. If motion is detected, the microcomputer 152 also immediately causes the ISDN interface IC 162 to place a telephone call to the video monitoring facility. After the video security monitoring system 10 is in communication with the video monitoring facility it will begin transmitting compressed digital video data there. At the same time, commands may be sent from the video monitoring facility to the video security monitoring system 10 for controlling its operation.

In the preferred embodiment of the video security monitoring system 10, if movement enters a central region of the image, the system 10 temporarily interrupts compressing the video data in accordance with the H.261 standard to compress a single image using the much higher quality JPEG image compression standard. By communicating data between the video security monitoring system 10 and the video monitoring facility in accordance with the CCITT H.221 standard, this higher quality JPEG image may be intermixed with the lower quality H.261 images for transmission the video monitoring facility over the ISDN basic access communication channel 28.

The video security monitoring system 10 incorporates certain features to facilitate its installation and operation. For example, the video security monitoring system 10 always responds to a telephone call. Thus, the video monitoring facility may always call the video security monitoring system 10 to confirm its proper operation. Furthermore, if after responding to a telephone call the video security monitoring system 10 receives a specified command and if no data specifying a telephone number is presently stored at a specified location in the SRAM 156, the system 10 then accepts and stores of a telephone number transmitted from the video monitoring facility. The video security monitoring system 10 will then call that telephone number if it subsequently detects motion as described above. The video security monitoring system 10 may also provide a feature of immediately calling back to the telephone number immediately after its storage in the SRAM 156. This call-back feature provides a means for immediately confirming that the video security monitoring system 10 is operating correctly and that the correct telephone number has been stored in the SRAM 156.

The Digital Audio Compression-Decompression Subsystem 96

As illustrated in FIG. 2, if the digital audio compression-decompression subsystem 96 is included in the video security monitoring system 10, the subsystem 96 includes a TMS320C25 digital signal processor ("DSP") IC 172. The DSP IC 172 processor is more completely described in the "Texas Instrument DSP Hand Book" and is manufactured by Texas Instruments Incorporated of Dallas, Tex. In addition to the DSP IC 172, the digital audio compression-decompression subsystem 96 includes a 64 KByte SRAM.174 that exchanges data with the DSP IC 172 over a compressed audio data bus 176. The digital audio compression-decompression subsystem 96 also includes a CS4215 Stereo Audio Codec IC 178 manufactured by Crystal Semiconductor Corporation of Austin, Tex. The audio codec 178 includes an ADC 182 and a digital-to-analog converter ("DAC") 184.

If the video security monitoring system 10 includes the microphone 92, the ADC 182 receives the audio signal from the microphone 92 via the audio input line 94. The ADC 182 then digitizes this audio signal to generate digitized audio data that it transmits to the DSP IC 172 via a digitized audio input data bus 186. Similar to the VC IC 134 and the VP IC 136, the DSP IC 172 monitors the digitized audio data to detect if there is a change in the sound about the video security monitoring system 10. If a change in sound occurs, the DSP IC 172 transmits data over the system bus 26 to the digital signal transmission interface and control 24 notifying it of the event. The microcomputer 152 responds to this notification by transmitting control signals to the digital audio compression-decompression subsystem 96 which increases the clock speed of the DSP IC 172 and cause it to begin converting the digitized audio data into compressed digital audio data and transmitting the compressed digital audio data to the digital signal transmission interface and control 24 via the system bus 26. The DSP IC 172 compresses the digitized audio data in accordance with one of the audio compression standards, such as the CCITT standard G.711 or G.722, that adapt audio data for transmission over an ISDN communication channel. Concurrent with initiating production of compressed digital audio data by the digital audio compression-decompression subsystem 96, the microcomputer 152 also places a telephone call to the video monitoring facility, and begins storing the compressed digital audio data in a queue buffer on the compressed data memory 42 if one is included in the video security monitoring system 10.

If the video security monitoring system 10 includes the speaker 104, then the DSP IC 172 may receive compressed digital audio data from the video monitoring facility via the ISDN basic access communication channel 28, the ISDN interface IC 162, the microcomputer 152, and the system bus 26. Upon receiving such compressed digital audio data, the DSP IC 172 decompresses it and transmits it via a digitized audio output data bus 188 to the DAC 184. Upon receiving the digitized audio data, the DAC 184 converts it to an audio signal that it transmits via the audio output line 102 to the speaker 104.

INDUSTRIAL APPLICABILITY

While operation of the video security monitoring system 10 is preferably energized by electrical energy received through the ISDN basic access communication channel 28, the system 10 may also receive its electrical power through any of the communication channels identified above except for the optical fibre communication channel and the wireless communication channel. Since operation of the video security monitoring system 10 with either of these two latter communication channels requires another source of electrical power to energize the operation of the system 10, it is within the purview of the present invention to energize the operation of the system with electrical power supplied either from a communication channel or from some other source.

The VC IC 134 and the VP IC 136 of the preferred embodiment of the video security monitoring system 10 detect motion in the area viewed by the lens 14 by successively comparing 8-by-8 blocks of pixels taken from two consecutive images. However, it is within the purview of the present invention to compare blocks of pixels containing fewer or more than 64 pixels.

The preferred embodiment of the video security monitoring system 10 employs standard protocols for compressing digital video and digital audio data. Thus, display systems capable of presenting an image and/or sound respectively either from digital video data or digital audio data compressed in accordance with such standards may be employed in the video monitoring facility.

While the preceding description of the video security monitoring system 10 has emphasized its capability for detecting either motion or a change in sound and alerting the video monitoring facility to such an event, at any time an operator at the video monitoring facility may initiate communication with the video security monitoring system 10 to send it commands for controlling its operation. Such operator commands may include any operation of which the video security monitoring system 10 is capable, including directing the video security monitoring system 10 to transmit either compressed digital video data of an image or compressed digital audio data of sound back to the video monitoring facility.

Although the present invention has been described in terms of the presently preferred embodiment, it is to be understood that such disclosure is purely illustrative and is not to be interpreted as limiting. Consequently, without departing from the spirit and scope of the invention, various alterations, modifications, and/or alternative applications of the invention will, no doubt, be suggested to those skilled in the art after having read the preceding disclosure. Accordingly, it is intended that the following claims be interpreted as encompassing all alterations, modifications, or alternative applications as fall within the true spirit and scope of the invention.

What is claimed is:

1. A video security monitoring system comprising:

a video camera for producing a video signal from an image of an area viewed by a lens of said video camera, said video camera including an iris control;

a digital video image compression subsystem for receiving the video signal from said video camera, for digitally processing the video signal to determine if any motion is occurring in the area viewed by the lens of said video camera, for converting the video signal into compressed digital video data that provides an image of the area viewed by the lens of said video camera, and for transmitting the compressed digital video data;

a digital signal transmission interface and control for controlling operation of said video camera and said digital video image compression subsystem, for receiving the compressed digital video data from said digital video image compression subsystem, and for transmitting the compressed digital video data from said video security monitoring system to a remote video monitoring facility via a communication channel if said digital video image compression subsystem determines that motion has occurred in the area viewed by the lens of said video camera, said digital signal transmission interface and control also managing power consumption by said video security monitoring system by causing said video camera and said digital signal image compression subsystem to operate at a slower clock speed when motion is not present in the area viewed by the lens of said video camera and to operate at a faster clock speed upon detecting motion in the area viewed by the lens of said video camera; and a camera controller for effecting changes in settings of the iris control of said video camera to compensate for changes in video camera sensitivity resulting from operation of said video camera at different clock speeds in effecting power management of said video security monitoring system.

2. The video security monitoring system of claim 1 wherein said digital signal transmission interface and control transmits the compressed digital video data from said video security monitoring system via an ISDN basic access communication channel.

3. The video security monitoring system of claim 1 wherein said digital signal transmission interface and control transmits the compressed digital video data from said video security monitoring system via an ISDN primary access communication channel.

4. The video security monitoring system of claim 1 wherein said digital signal transmission interface and control transmits the compressed digital video data from said video security monitoring system via an analog signal communication channel.

5. The video security monitoring system of claim 4 wherein said digital signal transmission interface and control further includes a modem for transmitting the compressed digital video data from said video security monitoring system via the analog signal communication channel.

6. The video security monitoring system of claim 1 wherein said digital signal transmission interface and control receives electrical power for energizing operation of said video security monitoring system from the communication channel.

7. The video security monitoring system of claim 6 further comprising a power supply for adapting electrical energy received from the communication channel for energizing the operation of electronic circuits included in said video camera, said digital video image compression subsystem, said digital signal transmission interface and control, and said camera controller.

8. The video security monitoring system of claim 7 wherein said power supply also stores electrical energy for energizing operation of said video security monitoring system.

9. The video security monitoring system of claim 8 wherein said power supply stores electrical energy in a battery.

10. The video security monitoring system of claim 1 wherein said digital signal transmission interface and control transmits the compressed digital video data from said video security monitoring system via an optical fibre communication channel.

11. The video security monitoring system of claim 1 wherein said digital signal transmission interface and control broadcasts the compressed digital video data from said video security monitoring system via a wireless communication channel.

12. The video security monitoring system of claim 1 wherein said video camera further includes a focus control, and said camera controller effects changes in settings of the focus control responsive to control signals received from said digital signal transmission interface and control.

13. The video security monitoring system of claim 1 wherein said video camera further includes a zoom lens, and said camera controller effects changes in settings of the zoom lens responsive to control signals received from said digital signal transmission interface and control.

14. The video security monitoring system of claim 1 wherein said camera controller tilts said video camera responsive to control signals received from said digital signal transmission interface and control.

15. The video security monitoring system of claim 1 wherein said camera controller pans said video camera responsive to control signals received from said digital signal transmission interface and control.

16. The video security monitoring system of claim 1 further comprising a serial control for exchanging digital signals between said digital signal transmission interface and control and a monitoring device external to said video security monitoring system.

17. The video security monitoring system of claim 16 wherein said monitoring device transmits signals to said video security monitoring system responsive to atmospheric conditions.

18. The video security monitoring system of claim 1 further comprising a compressed data memory for temporarily storing compressed digital video data transmitted from said digital video image compression subsystem.

19. The video security monitoring system of claim 18 wherein said compressed data memory retains compressed digital video data stored therein even after interruption of all electrical power that energizes operation of said video security monitoring system.

20. The video security monitoring system of claim 19 wherein said compressed data memory stores compressed digital data on a magnetic recording device.

21. The video security monitoring system of claim 19 wherein said compressed data memory stores compressed digital data in a FLASH semiconductor memory.

22. The video security monitoring system of claim 1 further comprising a strobe light for momentarily illuminating the area viewed by the lens of said video camera.

23. The video security monitoring system of claim 22 wherein said strobe light emits a pulse of light respensive to a signal received from said digital signal transmission interface and control.

24. The video security monitoring system of claim 22 wherein said strobe light emits a pulse of light responsive to a signal received from said digital video image compression subsystem.

25. The video security monitoring system of claim 1 further comprising a light emitting stylus that emits light directed toward the lens of said video camera for presenting an image indicating motion of said stylus to said video camera.

26. The video security monitoring system of claim 1 further comprising:
   a microphone for producing an audio signal from sound occurring about said video security monitoring system; and
   a digital audio compression subsystem for receiving the audio signal from said microphone, for digitally processing the audio signal to determine if any change in sound has occurred about said video security monitoring system, for converting the audio signal into compressed digital audio data of sound occurring about said video security monitoring system, and for transmitting the compressed digital audio data to said digital signal transmission interface and control.

27. The video security monitoring system of claim 1 further comprising:
- a digital audio decompression subsystem for receiving compressed digital audio data from said digital signal transmission interface and control, for converting the compressed digital audio data into an audio signal, and for transmitting the audio signal; and
- a speaker for receiving the audio signal from said digital audio decompression subsystem and producing an audible sound therefrom.

28. A method for operating a video security monitoring system, the video security monitoring system including a video camera and a digital video image compression subsystem that are fabricated using digital circuits which operate in response to a clock signal, said method comprising the steps of:
- providing a slow clock signal to the digital circuits included in the video security monitoring system whereby the video security monitoring system requires a low amount of electrical power;
- producing a video signal from an image of an area viewed by a lens of the video camera and transmitting the video signal to the digital video image compression subsystem;
- digitally processing the video signal in the digital video image compression subsystem to determine if any motion is occurring in the area viewed by the lens of the video camera;
- if motion is detected in the area viewed by the lens of the video camera, providing the digital circuits included in the video security monitoring system with a faster clock signal thereby changing video camera sensitivity and increasing the amount of electrical power required by the video security monitoring system, and altering an iris of the video camera to compensate for a change in video camera sensitivity and commencing conversion by the digital video image compression subsystem of successive images of the video signal received from the video camera into compressed digital video data to produce compressed digital video data for a sequence of images of the area viewed by the lens of the video camera; and
- transmitting the compressed digital video data from the video security monitoring system to a remote video monitoring facility via a communication channel.

29. The method of claim 28 further comprising the steps of:
- compressing the video signal to produce a lower quality image while the digital video image compression subsystem detects no motion within a central region of the image; and
- compressing the video signal to produce a higher quality image if the digital video image compression subsystem detects motion in the central region of the image.

* * * * *